March 26, 1968  F. KOHLER ETAL  3,375,344
WELDING ASSEMBLIES OF ELONGATED MEMBERS
Filed May 7, 1964  4 Sheets-Sheet 4
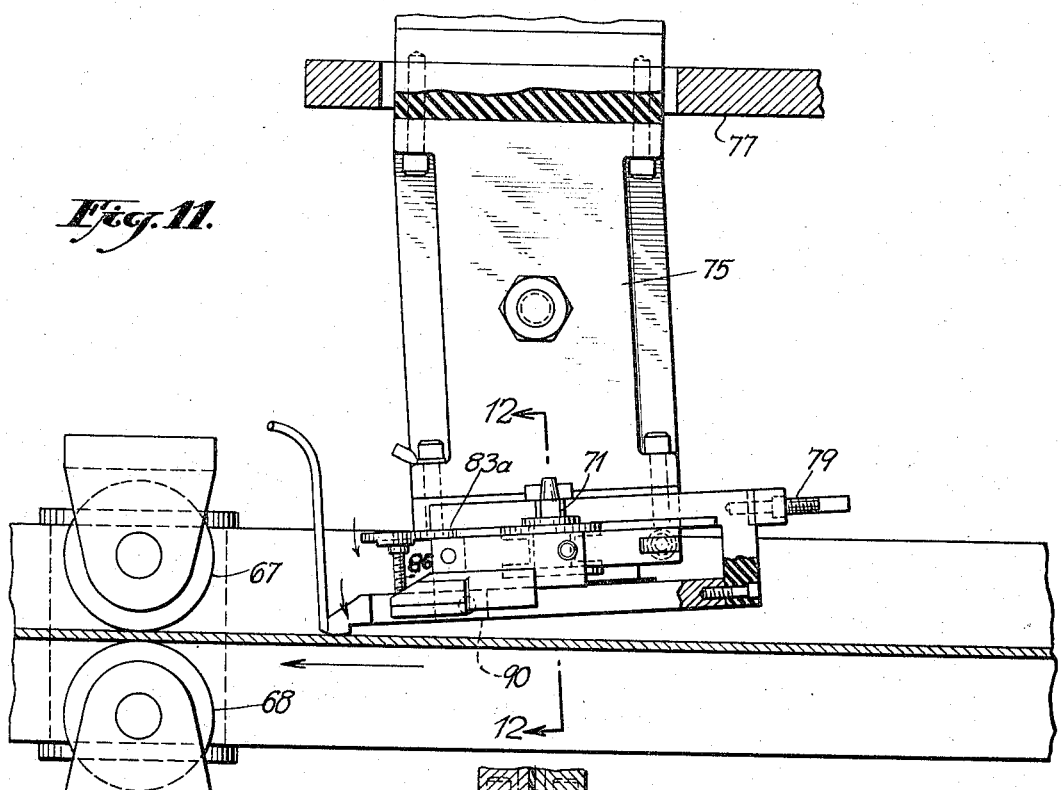
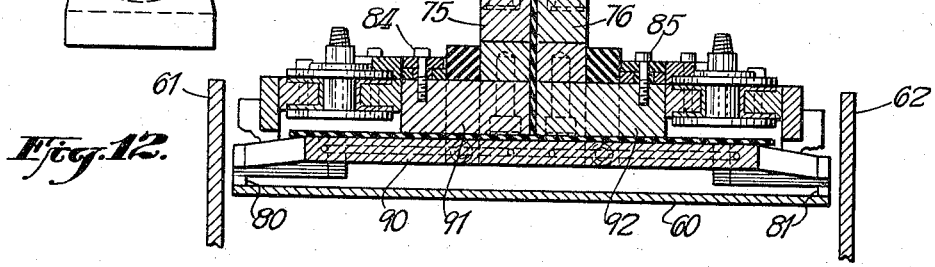
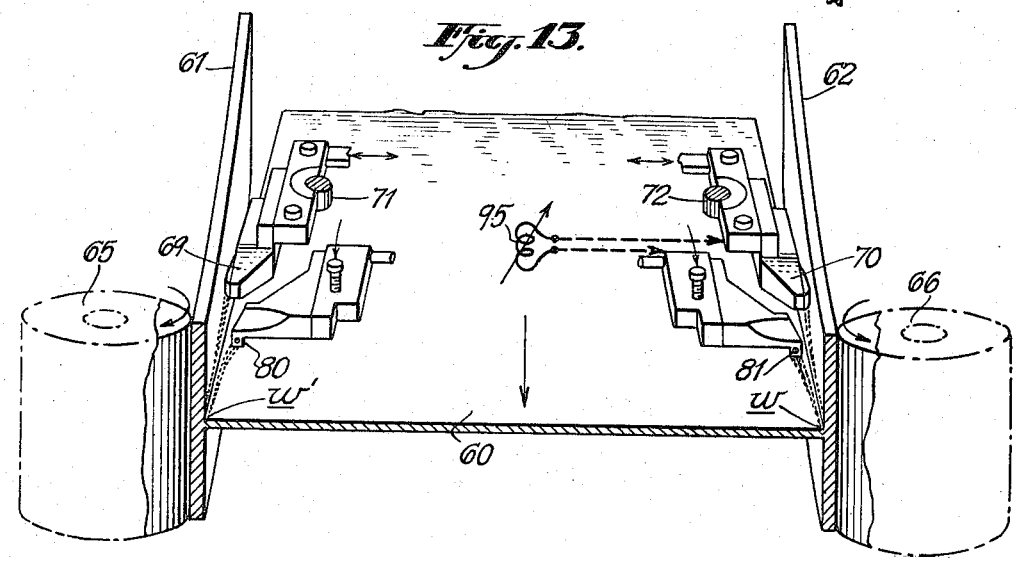

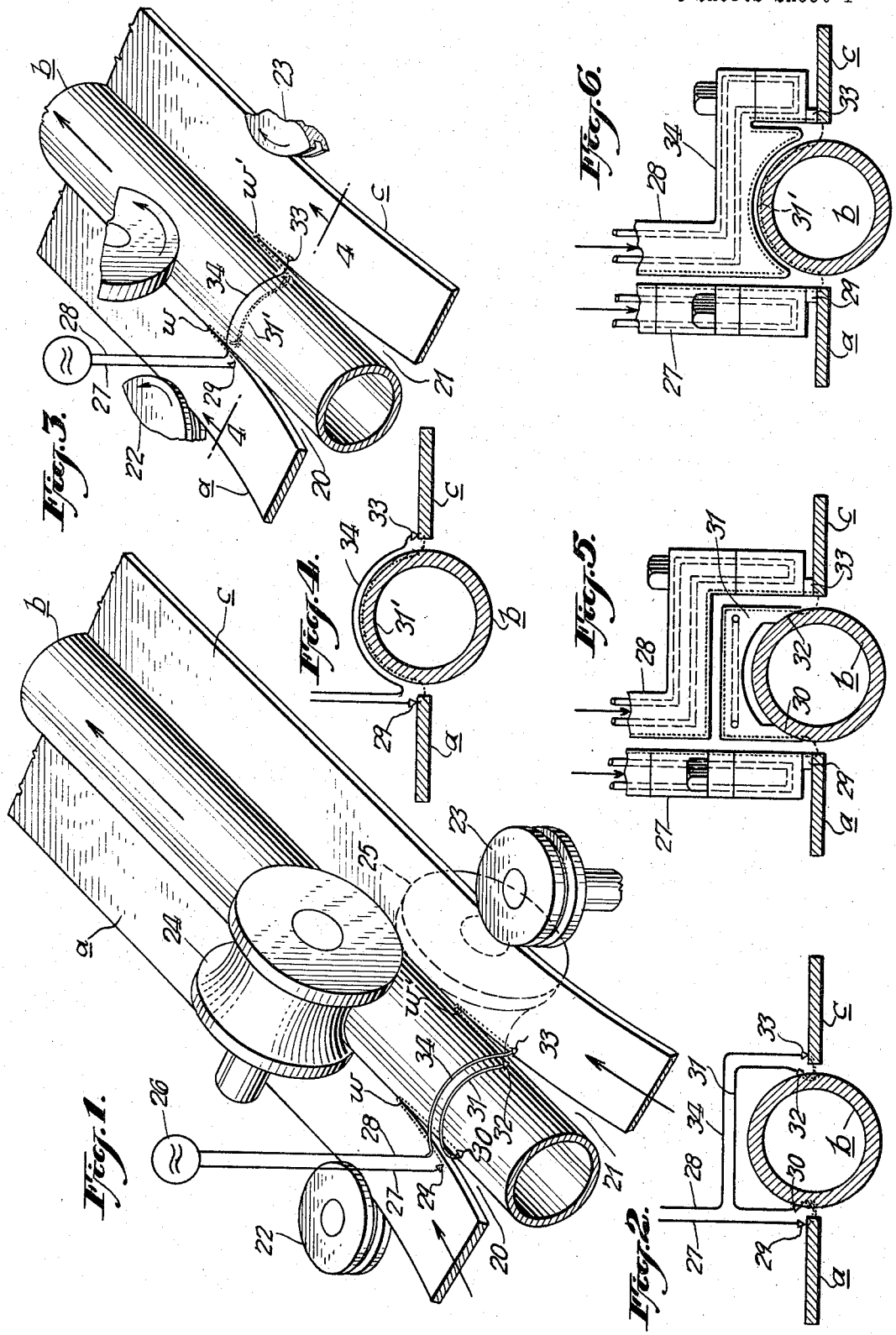

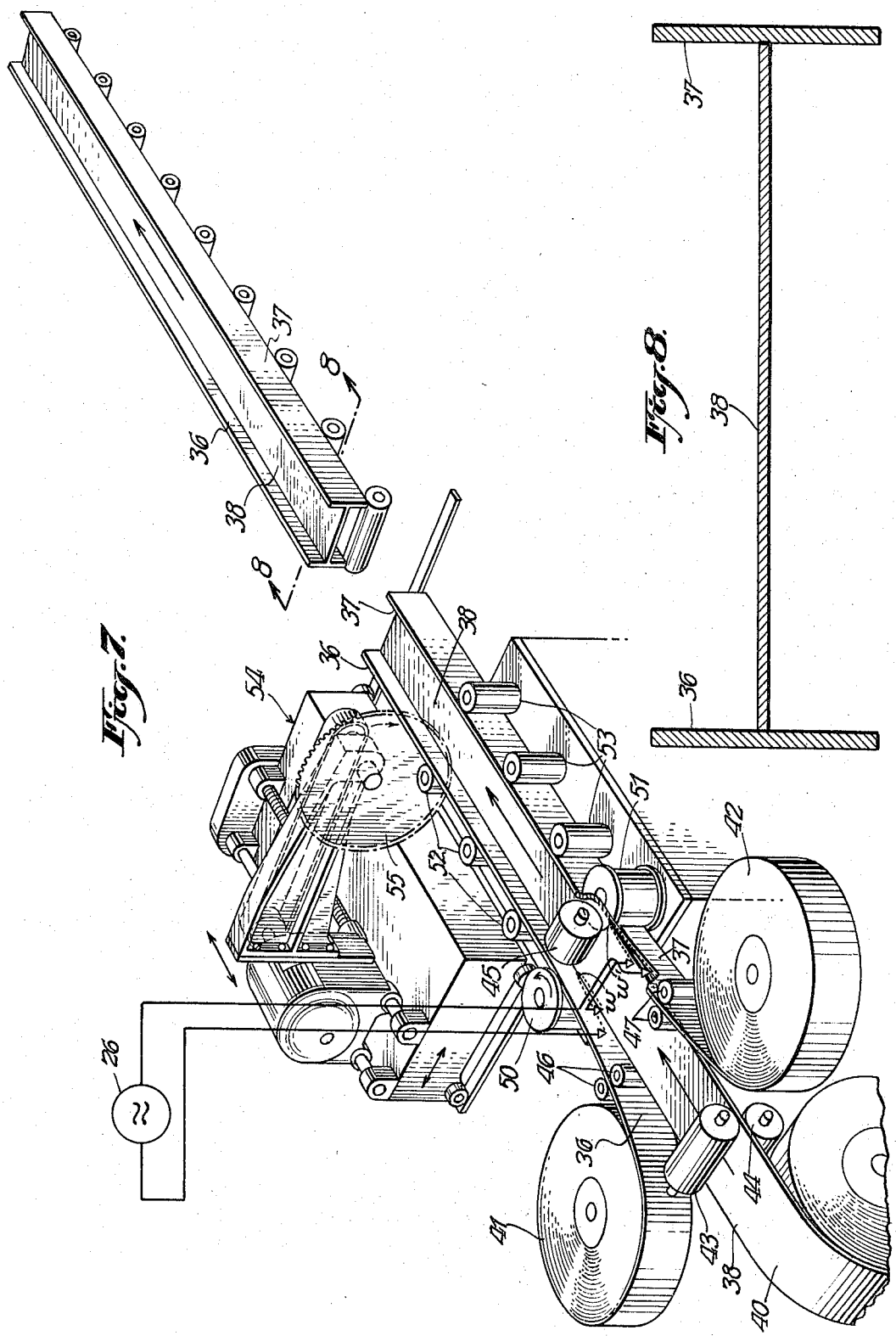

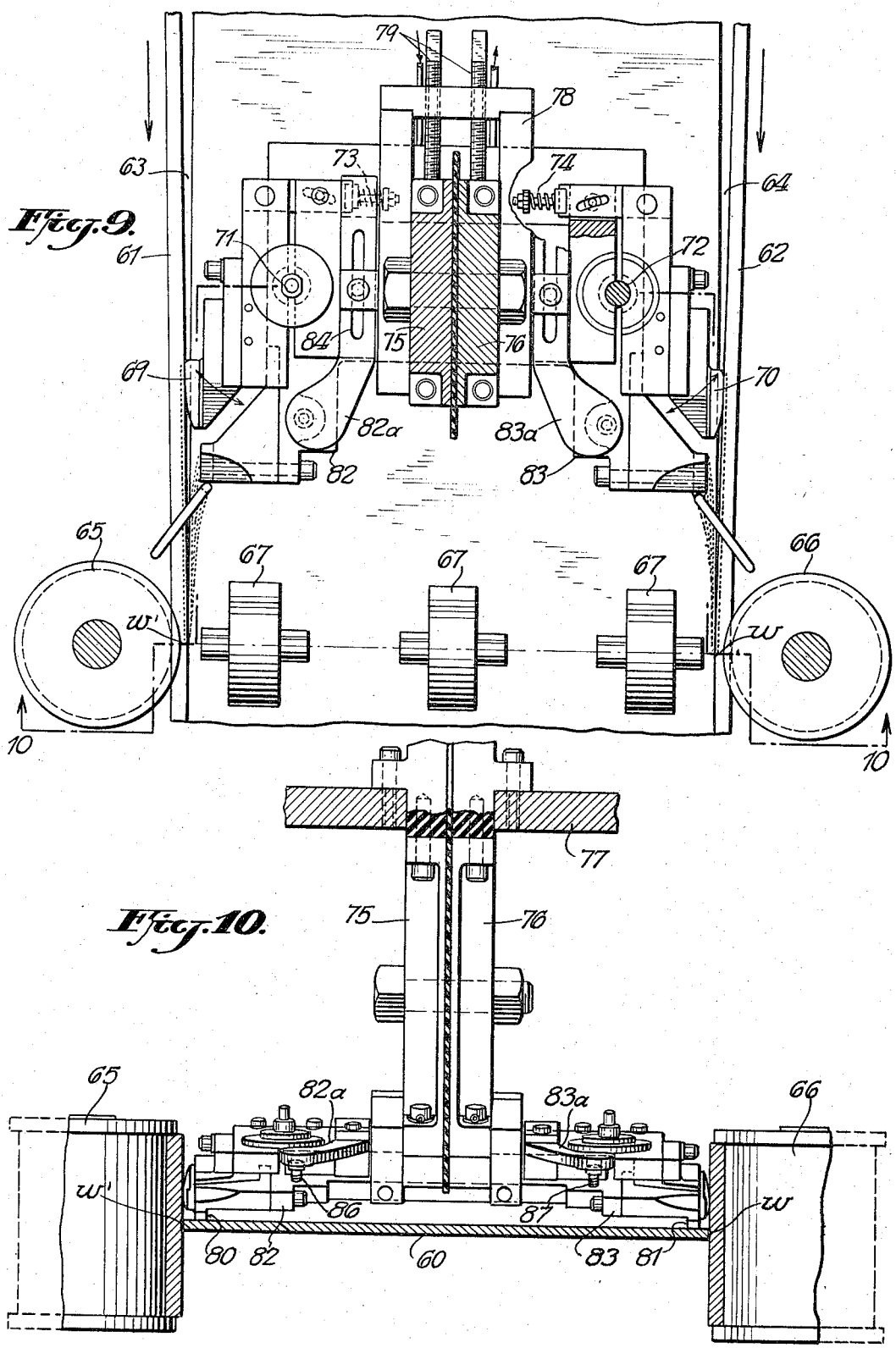

United States Patent Office 3,375,344
Patented Mar. 26, 1968

3,375,344
**WELDING ASSEMBLIES OF
ELONGATED MEMBERS**
Fred Kohler, New York, and Wallace C. Rudd, Larchmont, N.Y., assignors to American Machine & Foundry Company, New York, N.Y., a corporation of New Jersey
Filed May 7, 1964, Ser. No. 365,578
17 Claims. (Cl. 219—107)

ABSTRACT OF THE DISCLOSURE

Method and apparatus for simultaneously welding metal members together at two spaced weld points using high frequency electrical current and V-gaps between the members with each weld point at the apex of a V-gap and the current being supplied to the edges of both V-gaps in advance of the weld points from a single current source. The current is caused to flow from a first point on one edge of a V-gap in advance of one weld point to a second point on the edge of the other V-gap in advance of the other weld point, rather than directly from one weld point to the other, by the use of a proximity conductor carrying the welding current and extending between said first and second points in close proximity to, but not in electrical contact with, the member or members intermediate said first and second points.

---

This invention relates to the welding together of pluralities of continuously-advancing elongated metal members, wherein one of the members is welded simultaneously to two or more other members.

In accordance with the invention, for example, a length of material which is to form the web of an I-beam or the like, may be welded along the side edges thereof respectively, simultaneously to other elongated members which are to form the flanges of the I-beam. Another example of various possible uses of the invention involves cases where an elongated element, such as a length of heat exchanger tubing, is to have longitudinally-extending fins or the like welded simultaneously respectively to opposite sides of the tubing.

In carrying out the invention, the engaging surface portions which are to be welded along the desired seam lines, are heated by applying thereto high frequency current by the use of contacts which respectively engage approaching V-shaped gap edges shortly in advance of each of the weld points, so that such current flows from said contacts along the approaching gap edges to and from the weld point for heating same to welding temperature, preferably just as the edge surfaces are pressed together. In accordance with the invention, it has been found possible for this purpose preferably to use a single source of high frequency current, which is so connected to the contacts for applying same to the workpieces that the paths of the heating current on the workpieces for each of the two or more simultaneously formed welds, will be connected in series, thus insuring the availability of the same amount of current for each weld, and in a way such that the welds will be alike, and by taking advantage of the properties of high frequency currents, the circuit will be relatively simple in principle and in practice, and highly efficient because of avoidance of any very substantial heating of any parts other than the surfaces to be welded.

The invention makes possible an important advantage in that, in order to form the desired two or more welded seams, the assembly of longitudinally-extending metal portions to be welded is passed through a relatively simple arrangement of apparatus, and only once, in forming the simultaneous welds. Furthermore, in the usual case, since the seam lines for the desired welds will be located at symmetrical positions on opposite sides of one of the elongated metal members (for instance the web for an I-beam as above referred to, or a tube to which fins are to be welded at opposite sides, as above indicated) the result will be that the heating of the portions of the advancing assembly to be welded will be simultaneous and symmetrical with respect to the general center line of the assembly, and thus while advancing, portions of the assembly will not tend to become distorted because of temperature differences and irregular expansion, as would be the case in the absence of such symmetrical simultaneous heating.

Assuming, as in a typical case, three elongated members $a$, $b$ and $c$ are to be welded together while rapidly advancing side by side, the middle member $b$ may for example, be advanced straight through the equipment, while member $a$ is advanced at one side thereof while being so guided that there is a V-shaped gap between the members $a$ and $b$ with the apex of the gap at a first weld point $w$. Meanwhile, the third member $c$ may be similarly advanced along the other side of member $b$, while being so guided that there will be a V-shaped gap also between members $b$ and $c$, having its apex at a weld point $w'$, preferably directly opposite weld point $w$. With this arrangement of the advancing members, one terminal of the high frequency source of current is connected by a contact to member $a$ at a point in advance of weld point $w$, so that the current will flow from such contact to weld point $w$ along one side of the first V-shaped gap, thence from weld point $w$ back along the other side of the V-shaped gap on member $b$ to a point in the region opposite said contact. Thence the current is so guided as to flow transversely across to the opposite side of member $b$ and to flow along one side of the second V-shaped gap to the weld point $w'$ from a point in advance thereof, thence back along the opposite side of the second V-shaped gap on the edge of member $c$ to a second contact. From the second contact, a return circuit path to the source of high frequency current is provided by a conductor extending transversely of member $b$ over to a point close to the first contact and thence running to the current source. Such transverse conductor is located along in close proximity to the transverse path which the current followed from the first V-shaped gap to the second. Such proximity not only insures a low impedance path for the current in travelling from one of the V-shaped gaps transversely of member $b$ to the other gap and back again, but also the position of such proximity conductor may be so adjusted in directions forwardly or rearwardly of the advancing workpieces, as to correspondingly control the position of the path of flow of the high frequency current from the first V-gap over to the second. Such control in turn may be utilized, if desired, to control the effective lengths of the paths of the heating currents on one edge of each V-shaped gap as compared with that on the opposed edge. Thus, if the nature of the metal or its cross-sectional volume is such that one edge requires more heating than the other to reach welding temperature at the weld point, that fact may be provided for.

These various aspects of the invention will be more clearly apparent from the following descriptions of the drawings.

According to another aspect of the invention, the current path transversely across the middle member from one V gap over the other, may be provided by a bridging conductor in some cases, in a way so as to provide a path of less inductance, such bridging conductor being preferably arranged in closely-spaced relation to the transverse proximity conductor above referred to.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view illustrating important features of one embodiment of the invention;

FIG. 2 is a transverse sectional view of the arrangement of FIG. 1, the view being taken at the region of the high frequency contacts;

FIG. 3 is a view similar to FIG. 1, but showing a somewhat modified form of arrangement;

FIG. 4 is a transverse sectional view taken substantially along line 4—4 of FIG. 3;

FIG. 5 is a view similar to FIG. 2, but showing in some detail the structural features which may be used for the contacts and conductor parts;

FIG. 6 is a view similar to FIG. 4, but similarly showing in some detail structural features of the contacts and parts which may be used;

FIG. 7 is a perspective view somewhat schematically showing an arrangement for utilizing the invention in the manufacture of I-beams;

FIG. 8 is a transverse sectional view along line 8—8 of FIG. 7;

FIG. 9 is a plan view partially shown in section showing in further detail certain mechanical arrangements of the conductors, contacts and contact supporting structure which may be used, for example, in welding the parts to form an I-beam, and with a circuit such as schematically shown in FIG. 7;

FIG. 10 is a vertical sectional view taken substantially along line 10—10 of FIG. 9;

FIG. 11 is a side elevational view of the arrangement of FIGS. 9 and 10;

FIG. 12 is a sectional view taken substantially along line 12—12 of FIG. 11; and FIG. 13 is a perspective view showing various of the contact supporting parts of the arrangement of FIG. 9.

Referring now to the drawings in further detail, in FIG. 1 there is shown a strip member *a*, a tube member *b* and another strip member *c*, all three being rapidly longitudinally advanced either by being driven by the rollers shown, or by other means, not shown, in such manner that one edge of strip *a* will become welded at weld point *w* to one side of tube *b*, the opposite side of which becomes welded at weld point *w'* to one edge of strip *c*. The strips *a* and *c* are suitably advanced, such as from coils thereof, and are so directed or deflected upwardly or downwardly as they approach the respective weld points *w* and *w'*, that there will be V-shaped gaps as at 20 and 21 between the edges of the strips and the member *b*, which gaps have apices respectively at the weld points *w* and *w'*. When the strips arrive at the weld points, they are forced under pressure edgewise, as by rollers 22, 23, firmly into engagement with the member *b*, the latter being suitably guided as by upper and lower rollers 24 and 25.

High frequency current from a suitable source, such as a power oscillator at 26, may be conducted by leads 27, 28, whereby a current path is provided from 27 to a contact 29 engaging strip *a* near its edge at the gap 20. Such current will flow from this contact to the weld point *w*, thence along on the opposed surface of member *b* back to a contact 30, thence by a bridge member 31 over to a contact 32 on the opposite side of member *b*, thence along on the surface of the latter along one side of gap 21 to the weld point *w'*, thence back along the opposite edge of gap 21 to a contact 33, thence transversely of member *b* along a proximity conductor 34 over to the lead 28 and back to the current source.

A current path is thus provided on which all portions thereof run along in closely spaced relation to other portions thereof which, at any one moment, carry current flowing in the opposite direction, thus insuring an efficient circuit with low impedance. The current flowing to and from weld point *w* at the sides of gap 20 will be very closely concentrated on the very surfaces of the members at such gap by reason of mutual inductance and because of the fact that the current at any moment on one side of the gap is flowing in a direction opposite to that on the other. Like conditions prevail with the current flowing on opposite sides of gap 21.

While the various parts of the circuit are shown schematically in FIG. 1, it will be understood that, as is usual with such high frequency circuits, the various portions thereof, as well as the contact supports, should be suitably fluid cooled.

In case opposed surfaces at each gap 20 or 21 require approximately the same amount of heating current applied for the same interval of time in order to heat same up to optimum welding temperature upon reaching the weld point, then all of the contacts 29, 30, 32 and 33 may be located at the same distance in advance of their respective corresponding weld points, this distance being readily determinable by trial, so as to insure that the preferable approaching edge surfaces only become heated to welding temperature upon arrival at the weld points, and without overheating and softening of the metal to any substantial depth, which would render conditions less favorable for securing good forged welds when the parts come together at the weld points. On the other hand, if the members *a*, *b* and *c* are formed of different metals requiring different optimum welding temperatures, or if their cross-sections and dimensions are such that more or less prolonged heating is desirable on one side of each gap as compared with the other, then the distances of the contacts in advance of the weld points may be readily adjusted. For example, if member *b* is such that longer heating current paths are desirable thereon, then the contacts 30 and 32, as well as the bridge 31, may be moved further away from the weld point, or if member *b* is such that it will tend to become heated too rapidly, these contacts may be moved closer to the weld point. Similarly the positions of the contacts 29 and 33 may be adjusted, but preferably the conductors 31 and 34 are so adjusted in positions that, despite the contact adjustments, they will be retained in positions extending along close to each other. Conductor 31, if desired, may be spaced considerably above member *b* for safe clearance with respect thereto, as indicated in FIG. 2.

It should be noted that, while the member *b* provides a conductive path directly from contact 30 to contact 32, this path will have greater impedance than the path provided by conductor 31, because the latter is arranged much closer to the return circuit path provided by proximity conductor 34. Hence, even though the member *b* may provide a direct path from contact 30 to contact 32, having a very low ohmic resistance, yet this is immaterial inasmuch as we are concerned here with high frequency currents which are constrained to follow the lowest impedance paths and with which ohmic resistance is a relatively negligible factor.

The frequency used may be of the order of 50,000 to 100,000 cycles per second or preferably much higher, such as 300,000 to 450,000 cycles per second, and with such frequencies a so-called "proximity conductor," such as shown at 34, is highly effective in controlling the flow of current along the opposite side of any circuit portion to which it is in proximity. That is, the current flow will be concentrated as closely as possible to the proximity conductor.

By utilizing these principles, it will now be apparent that a more simplified arrangement may sometimes be used, such as shown in FIGS. 3 and 4, where parts corresponding to FIGS. 1 and 2 are identified by the same reference characters. Here, however, it will be noted that the transverse conductor 31, as well as its contacts 30 and 32, may be omitted, and instead the current will flow transversely across member *b* from one side of gap 20 over to gap 21 along a path located approximately as indicated at 31', this path being determined by reason of the fact that it is the closest possible transverse path with respect to the proximity conductor 34. Since the conductor 34 compels the path 31' to be located at the general position indicated, this will result in heating current flowing on opposite sides of each of the V-shaped gaps to and from the weld point for substantial distances in advance thereof, even though no contacts such as at 30 and 32 of FIG. 1 are used in FIG. 3.

The speed of advance of the workpieces may be quite substantial depending on the amount of power used to supply the heating current, as well as the positioning of the contacts and the amounts of metal which necessarily become heated along the V-shaped gaps. In a typical case, such as for welding heavy I-beams (or so-called H-beams) such as hereinafter described, it has been found that it is possible to advance the work at a speed of some 35 feet per minute or faster. In this particular example, the web strip was 12 inches wide and 3/16 inch thick, and the two flanges were 4 inches wide and 3/8 inch thick. A 280 kilowatt source of high frequency power was used. With smaller or lighter workpieces, much greater speeds, up to hundreds of feet per minute, may be possible.

In any event, in view of the nature of the concentrated flows of current along the opposed surfaces of the V-shaped gaps for some substantial distance in advance of the weld point, the surfaces can readily be heated to welding temperature, without meanwhile heating to any substantial degree the metal along the transverse current paths of the member *b*, even if the arrangement of FIG. 3 is used, particularly since the member *b* will pass the current path 31' too quickly to become substantially heated, and in the case of the arrangement of FIG. 1, substantially no current will flow transversely across on the member *b*, the current flowing along the bridge 31 instead.

With the arrangement of FIGS. 2 and 3, if it is desired either to lengthen or shorten the paths of the heating current along member *b* at the gaps 20 and 21, then it is merely necessary to shift the position of the proximity conductor 34 forwardly or rearwardly and the transverse current path 31' will thereby be constrained to become shifted accordingly to lengthen or shorten such heating paths.

With the above-described arrangements, it will be apparent that since the paths of the heating current to and from the weld points along gaps 20 and 21 are all in series, it results that substantially the same amount of current becomes available for forming both welds, and hence two welds may readily be made alike and simultaneously, with one weld point preferably directly opposite the other at opposite sides of the member *b*. Also, the resulting heating effects on opposite sides of the member *b* being symmetrical as to timing and degree, any resulting expansion of the metal of the workpieces will not tend to cause irregular bending or distortions thereof to either side of the axis of the welded assembly.

In actual practice, the circuit symmetrically shown in FIG. 1, may be constructed in a manner such as shown in FIG. 5, wherein the leads 27, 28 are made rigid and self-supporting, and carry supports for the contacts 29 and 33, these various parts, as indicated by dotted lines, being formed with cooling fluid cavities. Here the bridge member 31 may be mounted by suitable means (not shown) and, as indicated by dotted lines, this also has a cooling fluid cavity, and this bridge serves to carry the contacts 30 and 32.

Similarly the structure for the arrangements of FIGS. 3 and 4 may be such as indicated in FIG. 6.

In both FIGS. 5 and 6, the high frequency current will be closely concentrated to flow along paths as indicated by the small series of dots in each figure.

With the embodiment of FIG. 7, the parts are arranged for welding the flanges 36 and 37 to opposite edges of a web 38 to form an I- or H-beam. The material for forming the web and flanges may conveniently be supplied from the steel mills in the form of rolled-up strips, such as indicated at 40, 41 and 42, and the material in this form may, of course, be much more conveniently shipped for use elsewhere than is the case where the steel is rolled at the mill in the cross-sectional shape of a beam. Also, to accommodate varying conditions where it may be desired to use different grades of steel for the web material and the flange material, or different thicknesses or widths, any such desired variations may readily be accommodated by the use of the present invention, which enables welding the desired beam of the particular dimensions required, in effect in one welding operation, upon selecting strip material appropriate for the dimensions of the particular beam desired.

As shown somewhat schematically in FIG. 7, the strip 38 for the web material may be advanced as by driven rollers 43, 44; also by an upper roller as at 45, there being preferably a corresponding roller underneath the web at that point. Similarly, the flange strips may be advanced respectively as by rollers 46 and 47, so positioned as to direct the webs 36 and 37 at slight angles with respect to the edges of the web 38, whereby there will be V-shaped gap formations in advance of the two weld points *w* and *w'*.

The flanges may be forced against the opposed edges of the web 38 at the weld points, as by pressure rollers 50 and 51, which may be driven, if desired.

After the I-beam becomes completely formed at the weld points, it may be advanced and guided as by rollers, such as 52, 53.

The coiled strip material is preferably provided in quite long lengths, so that, if desired, extensive beam sections may be formed in long continuous lengths, but same may, if desired, be severed into shorter lengths at suitable intervals, as by the use of suitable known so-called "flying saw" cut-off equipment, as indicated at 54, equipped with a saw 55. Since such equipment is known, same need not here be further described.

The high frequency circuit and contact arrangements are schematically shown in FIG. 7, as will be noted, in the form substantially as above described in connection with FIGS. 1 and 2, although in some cases, if preferred, the arrangements therefor, as of FIGS. 3 and 4 (suitably adjusted) might be used.

Reference will now be made to FIGS. 9–13, showing one example of the ways in which the contacts and supporting structure thereof, and conductors thereto, may mechanically be arranged for apparatus designed to weld I- or H-beam formations, with a high frequency circuit of the type schematically shown in FIGS. 1 and 7.

As shown in FIGS. 9–13, the web of the beam being formed is indicated at 60, and the two side flanges at 61 and 62 respectively, these being guided to the weld points *w* and *w'* in advance of which V-shaped gaps as at 63, 64 are located. The flanges are pressed against the edges of the web at the weld points as by rollers 65, 66, while the web is guided and held in place as by rollers such as at 67 and 68. Contacts 69 and 70 (which correspond to contacts 33 and 29 of FIG. 1) are so mounted as slidably to engage the inner surfaces of the flanges 63, 64 respectively at positions just above the web 60. These contacts may be carried on mounting means similar to those shown in U.S. patent to Morris et al. No. 3,056,882, granted Oct. 2, 1962. That is, the mounting means are suitably pivoted as at 71, 72 respectively, and so that adjustable spring means, as at 73 and 74, may be used to cause the contact mounting means to turn about their pivots and press the contacts 69 and 70 into resilient sliding engagement with the webs 61 or 62 respectively.

The whole contact structure may be mounted upon a pair of heavy conductors as at 75, 76, insulated from each other and the upper end portions of which are carried on suitable mounting means as at 77 (FIG. 11) and to the lower ends of which suitable bracket structures 78 are mounted in a manner to be adjustable forwardly and rearwardly as by insulation screws 79, in order to adjust the position of the whole contact assembly forwardly or rearwardly with respect to the weld points.

Additional contacts 80, 81 respectively, are provided (corresponding to contacts 32 and 30 of FIG. 1) and these are mounted on suitable bracket means 82 and 83, which in turn may each be adjusted forwardly and rearwardly as by pin-in-slot adjustable means, as indicated at 84 and 85 (see FIG. 9), the brackets 82 and 83 being in part supported by slotted resilient insulation strips 82a and 83a. Adjustment screws as at 86 and 87 may be provided for adjusting the pressure with which contacts 80 and 81 bear against the top surface of the web 60 at locations close to the edges thereof.

As will best be apparent from FIG. 12, the contacts 80 and 81 are interconnected by a bridge or bar portion 90 (corresponding to the bridge 31 in FIG. 1). Also, as best shown in this figure, the heavy supporting conductor members 75, 76 at their lower ends are secured respectively to conductor bars 91 and 92, insulated from each other, and which extend outwardly and carry the current to the mountings for contacts 69 and 70. That is, the conductor bar portions 91, 92 together comprise the equivalent of the proximity conductor 34, referred to in connection with FIGS. 1 and 3. In case the web is to be formed of non-ferrous or non-magnetic metal, the bridge or bar 90 may be omitted and the high frequency circuit will then be as per FIGS. 3 and 4.

Arrangements are made for cooling fluid cavities or conduits through all of the above-described parts so far as necessary, and in accord with suitable known practice for cooling parts of high frequency circuits.

In FIGS. 9-13 inclusive, the paths along which the high frequency current will flow along the opposite sides of the V-shaped gaps in advance of the weld points are indicated approximately by the dotted lines, such as in FIGS. 9 and 13. If for any reason it should be found desirable to minimize the heating current along one of the gaps as compared with that along the other, this may be readily accomplished by connecting a variable reactor across contacts 70 and 81 (or across contacts 69 and 80) as schematically shown at 95. Such reactor may, for example, be of a construction such as shown in U.S. patent to Stanton et al. No. 2,856,499, granted Oct. 14, 1958, but ordinarily this use of such a reactor will not be found necessary.

The provision of the high frequency circuit in accordance with this invention in such form that the heating currents for each of the weld points will be in series, makes for an economical, compact and easily balanced arrangement, facilitating the control and adjustment of the various parts, as necessary. If instead of a series arrangement, it should be desired to connect the heating paths for the two welds in parallel, the current as supplied for the one as compared with the other, would have to be suitably balanced, such as possibly by the use of reactors as referred to above at 95, and of course in that event, the mechanical supporting structure arrangement would also have to be considerably remodified and in general so as to involve substantially more complications electrically and mechanically.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding at least three elongtaed metal members together in side-by-side relation, which comprises: rapidly advancing said members generally longitudinally while so guiding the first of said members that it forms a V-shaped gap with the second, the gap apex being at a first weld point; so guiding a third of said members that it forms a second V-shaped gap with said second member, said second gap having its apex at a second weld point; pressing the first and third members against the second member as same pass the weld points; providing a flow of high frequency current from one terminal to another terminal of a current source and following a path from said one terminal of the current source to a first contact engaged by said first member in advance of the first weld point, the path extending from such contact to the first weld point along one edge of the first gap, thence along the opposite edge of the first gap back on the second member to a first point a substantial distance in advance of the first weld point, thence along a path portion extending transversely of the second member over to a second point at one side of the second gap in advance of the second weld point, thence along the edge of said second gap on the second member to the second weld point, thence back along the opposite edge of the second gap to a second contact engaging the third member a substantial distance in advance of the second weld point, the path thereafter extending from said second contact along a conductor connected to said second contact and extending from adjacent said second point transversely of the second member in close proximity to but out of electrical contact with the aforesaid transverse path portion to adjacent said first point, and thence back to the other terminal of said current source.

2. Method for welding at least three elongated metal members together in side-by-side relation, which comprises: rapidly advancing said members generally longitudinally while so guiding the first of said members that it forms a V-shaped gap with the second, the gap apex being at a first weld point; so guiding a third of said members that it forms a second V-shaped gap with said second member, said second gap having its apex at a second weld point; pressing the first and third members against the second member as same pass the weld points; providing a flow of current of a frequency of 50,000 cycles per second or higher from one terminal to another terminal of a current source and following a path from said one terminal of the current source to a contact engaged by said first member in advance of the first weld point, the path extending from such contact to the first weld point along one edge of the first gap, thence along the opposite edge of the first gap back on the second member to a first point a substantial distance in advance of the first weld point, thence along on a bridge conductor extending transversely of the second member and at opposite ends, contacting said second member respectively at said first point and at a second point at one side of the second gap in advance of said second weld point, thence along the edge of said second gap on the second member to the second weld point, thence back along the opposite edge of the second gap to a second contact engaging the third member a substantial distance in advance of the second weld point, the path thereafter extending from said second contact along a conductor connected to said second contact and extending from adjacent said second point transversely of the second member in close proximity to but out of electrical contact with the aforesaid bridge conductor to adjacent said first point, and thence back to the other terminal of said current source.

3. Method for welding at least three elongated metal members together in side-by-side relation, which comprises: rapidly advancing said members generally longitudinally while so guiding the first of said members that it forms a V-shaped gap with the second, the gap apex being at a first weld point; so guiding a third of said members that it forms a second V-shaped gap with said second member, said second gap having its apex at a second weld point; pressing the first and third members against the second member as same pass the weld points; providing a flow of current of a frequency of 50,000 cycles per second or higher from one terminal to another terminal of a current source and following a path from said one terminal of the current source to a first contact engaged by said first member in advance of the first weld point, the path extending from such contact to the first weld point along one edge of the first gap, thence along the opposite edge of the first gap back on the second member to a first point a substantial distance in advance of the first weld point, thence along a path portion extending transversely on the surface of the second member over to a second point at one side of the second gap in advance of said second weld point, thence along the edge of said second gap on the second member to the second weld point, thence back along the opposite edge of the second gap to a second contact engaging the third member a substantial distance in advance of the second weld point, the path thereafter extending from said second contact along a conductor connected to said second contact and extending from adjacent said second point transversely of the second member in close proximity to but out of electrical contact with the aforesaid transverse path portion to adjacent said first point, and thence back to the other terminal of said current source.

4. Method in accordance with the foregoing claim 1, and in which the first and third of said members comprise strips, one edge of each of which becomes welded respectively to sides of the second member, said strips being guided to form said gaps by being deflected from the normal planes thereof while approaching the respective weld points.

5. Method in accordance with the foregoing claim 1, and in which said second member comprises the web of a beam and said first and third members comprise the flanges which become welded respectively to opposite sides of such web.

6. Method in accordance with the foregoing claim 1 and in which reactor means is connected to and between the edges of one of said gaps for adjusting the amount of heating current at said gap as compared with the amount at the other gap.

7. Method in accordance with the foregoing claim 3 characterized in that the lengths of current path portions along the gaps on the sides of the second member are adjusted in length as compared with those on the opposed gap edges respectively, by varying the distance of said transversely-extending conductor from the weld points, thereby correspondingly varying the position of the path portion which extends in proximity to said conductor transversely on the surface of the second member.

8. Apparatus for welding at least three elongated metal members together in side-by-side relation, which comprises: means for rapidly advancing said members generally longitudinally; means for so guiding the first of said members that it forms a V-shaped gap with the second, the gap apex being at a first weld point; means for so guiding the third of said members that it forms a second V-shaped gap with said second member, said second gap having its apex at a second weld point; means for forcing the first and third members under pressure against the second member as same pass the weld points; a source of current of a frequency of 50,000 cycles per second or higher; a contact connected to one terminal of said source and engaged by said first member at a location substantially in advance of the first weld point; another contact engaged by said third member at a location substantially in advance of the second weld point, a path for said current being provided from said first contact along one edge of the first gap to the weld point, thence back along the other edge of the first gap to a first point a substantial distance in advance of said first weld point, thence along a current path portion extending transversely of the second member from said first point to a second point at one edge of the second gap in advance of said second weld point, thence to the second weld point and back along the other edge of said second gap to said other contact; and a return conductor connected to said other contact and extending from adjacent said second point transversely of the second member in close proximity to but out of electrical contact with the aforesaid path portion to adjacent said first point and thence back to another terminal of the current source.

9. Apparatus in accordance with the foregoing claim 8 characterized in that said transversely-extending path portion is constituted of the surface of said second member.

10. Apparatus in accordance with the foregoing claim 8 and in which said transversely-extending path portion is constituted of a bridging conductive member connected to and extending from one edge of the first gap over to one edge of the second gap, said transversely-extending return conductor being located along in close proximity to but out of electrical contact with said bridging conductive member.

11. Apparatus in accordance with the foregoing claim 8 and in which adjustable mounting means are provided for said transversely-extending return conductor for adjusting the distance between such conductor and the weld points, thereby effectively adjusting the lengths of the current path portions which extend along the edges of the gap on the second member.

12. Apparatus in accordance with the foregoing claim 10 and in which adjustable mounting means is provided for said bridging conductor, to permit adjustment of the distance between same and the weld points, thereby effectively to adjust the lengths of the current path portions along the edges of the gaps on said second member.

13. Apparatus for welding a web of a beam along its side edges respectively to flanges of the beam, which comprises: means for rapidly advancing generally longitudinally, metal strips which are to form said web and flanges; means for guiding the flange-forming strips in positions to form first and second V-shaped gaps respectively with the edges of the web-forming strip, the apices of the gaps being respectively at first and second weld points located on opposite sides of the web-forming strip; means for forcing the flange strips respectively against the web strip edges as same pass the weld points; a source of current of the frequency of 50,000 cycles per second or higher; a contact connected to one terminal of said source and mounted to engage the inner surface of one of said flange-forming strips at a location substantially in advance of the first weld point; another contact mounted to engage the inner face of the other flange-forming strip at a location substantially in advance of the second weld point, a path for said current being provided from said first contact along the surface of the first flange-forming strip on one side of the first gap to the weld point, thence back along an edge of the web-forming strip to a first point a substantial distance in advance of said first weld point, thence along a current path portion extending transversely of the web-forming strip to a second point at one side of the second gap in advance of said second weld point, thence along on an edge of the web-forming strip to the second weld point and back along the surface of the other flange-forming strip to said other contact; and a return conductor connected to said other contact and extending from adjacent said second point transversely of the web-forming strip in close proximity to but out of electrical contact with the aforesaid transverse path portion to adjacent said first point, and thence back to another terminal of the current source.

14. Apparatus in accordance with the foregoing claim 13 and in which said transversely-extending path portion comprises a bridging conductor mounted to extend transversely across the web-forming strip and adapted to be engaged at its ends respectively by edge portions of the web-forming strip at locations opposite said contacts respectively.

15. Apparatus in accordance with the foregoing claim 14 and in which said contacts, return conductor and bridging conductor are carried on mounting means relatively adjustable in directions along the direction of advance of the strips.

16. Method for welding a plurality of elongated metal members together in side-by-side relation, which comprises: rapidly advancing said members generally longitudinally while so guiding a first of said members that it forms a V-shaped gap with portions of another of said members, the gap apex being at a first weld point; also so guiding another of said members that portions of same form a second V-shaped gap with portions of one of the members, said second gap having its apex at a second weld point; pressing the said members together to close said gaps as same pass the weld points; providing a flow of current of a frequency of 50,000 cycles per second or higher from one terminal to another terminal of a current source and following a path from said one terminal of the current source to a contact engaged by said first member in advance of the first weld point, the path extending from such contact to the first weld point along one edge of the first gap, thence along the opposite edge of the first gap back to a first point a substantial distance in advance of the first weld point, thence along on a bridge conductor extending transversely of the members and at opposite ends, contacting respectively the member providing said opposite edge at said first point and the member providing one side of the second gap at a second point in advance of said second weld point, thence along an edge of said second gap to the second weld point, thence back along the opposite edge of the second gap to a second contact engaging the member providing said last-mentioned opposite edge a substantial distance in advance of the second weld point, the path thereafter running along a conductor connected to said second contact and extending from adjacent said second point in close proximity to but out of electrical contact with the aforesaid bridge conductor to adjacent said first point, and thence back to the other terminal of the current source.

17. Method for welding a plurality of elongated metal members together in side-by-side relation, which comprises: rapidly advancing said members generally longitudinally while so guiding a first of said members that it forms a V-shaped gap with portions of another of said members, the gap apex being at a first weld point; also so guiding another of said members that portions of same forms a V-shaped gap with portions of another of said members, said second gap having its apex at a second weld point; pressing said members together to close said gaps as same pass the weld points; providing a flow of current of a frequency of 50,000 cycles per second or higher from one terminal to another terminal of a current source and following a path from said one terminal of the current source to a contact engaged by said first member in advance of the first weld point, the path extending from such contact to the first weld point along one edge of the first gap, thence along the opposite edge of the first gap back to a first point a substantial distance in advance of the first weld point, thence along a path portion extending transversely on the surface of another of said members over to a second point at one side of the second gap in advance of the second weld point, thence along one edge of said second gap to the second weld point, thence back along the opposite edge of the second gap to a second contact engaging the member providing said last-mentioned opposite edge a substantial distance in advance of the second weld point, the path thereafter extending along a conductor connected to said second contact and running transversely of the members from adjacent said second point to adjacent said first point and in close proximity to but out of electrical contact with the aforesaid transverse path portion, and thence back to the other terminal of said current source.

References Cited

UNITED STATES PATENTS

| | | | |
|---|---|---|---|
| 2,006,459 | 7/1935 | Jones | 219—101 |
| 2,108,795 | 2/1938 | Budd | 219—107 |
| 2,179,802 | 11/1939 | Sykes | 219—102 |
| 2,198,264 | 4/1940 | Caputo | 219—102 |
| 2,381,742 | 8/1945 | Guirl | 219—102 |
| 2,449,840 | 9/1948 | Brown | 219—81 |
| 2,821,619 | 1/1958 | Rudd | 219—107 |
| 2,856,499 | 10/1958 | Stanton et al. | 219—10.77 |
| 2,857,503 | 10/1958 | Rudd et al. | 219—59 |
| 3,056,882 | 10/1962 | Morris et al. | 219—65 |
| 3,144,543 | 8/1964 | Anderson | 219—102 |
| 3,175,069 | 3/1965 | Kohler | 219—59 |

FOREIGN PATENTS 385,391  11/1923  Germany.

RICHARD M. WOOD, *Primary Examiner.*

W. D. BROOKS, *Assistant Examiner.*